United States Patent
Kepplinger et al.

[11] Patent Number: 5,873,926
[45] Date of Patent: Feb. 23, 1999

[54] PROCESS FOR REDUCING OXIDE-CONTAINING MATERIAL AND PLANT FOR CARRYING OUT THE PROCESS

[75] Inventors: Leopold Werner Kepplinger; Siegfried Zeller, both of Leonding; Karl-Heinz Zimmerbauer, Hargelsberg, all of Austria; Roy Hubert Whipp, Jr., Miami, Fla.

[73] Assignee: Voest-Alpine Industrienlagenbau GmbH, Linz, Austria

[21] Appl. No.: 809,341

[22] PCT Filed: Sep. 14, 1995

[86] PCT No.: PCT/AT95/00180

§ 371 Date: Mar. 12, 1997

§ 102(e) Date: Mar. 12, 1997

[87] PCT Pub. No.: WO96/10094

PCT Pub. Date: Apr. 4, 1996

[30] Foreign Application Priority Data

Sep. 27, 1994 [AT] Austria ..................................... 1839/94

[51] Int. Cl.$^6$ ................. C21B 13/00; C22B 1/10

[52] U.S. Cl. ................. 75/444; 75/450; 266/172

[58] Field of Search ........................ 75/444, 450; 266/172

[56] References Cited

U.S. PATENT DOCUMENTS 5,082,251 1/1992 Whipp ..................................... 266/142
5,676,734 10/1997 Oberndorfer et al. ..................... 75/450

*Primary Examiner*—Melvyn Andrews
*Attorney, Agent, or Firm*—Ostrolenk, Faber, Gerb & Soffen, LLP

[57] ABSTRACT

In a process for reducing particulate oxide-containing material using the whirl bed method, the oxide-containing material, by means of reducing gas flowing from bottom to top, is maintained in the whirl layer, thus being reduced. In order to avoid or considerably reduce operational interruptions of the reduction process caused by sticking or fouling, the clear tube speed (superficial velocity) of the reducing gas, exclusively above the whirl layer, is continuously lowered along the total free height of a space above the whirl layer while the formation of further whirl formations is avoided.

25 Claims, 2 Drawing Sheets

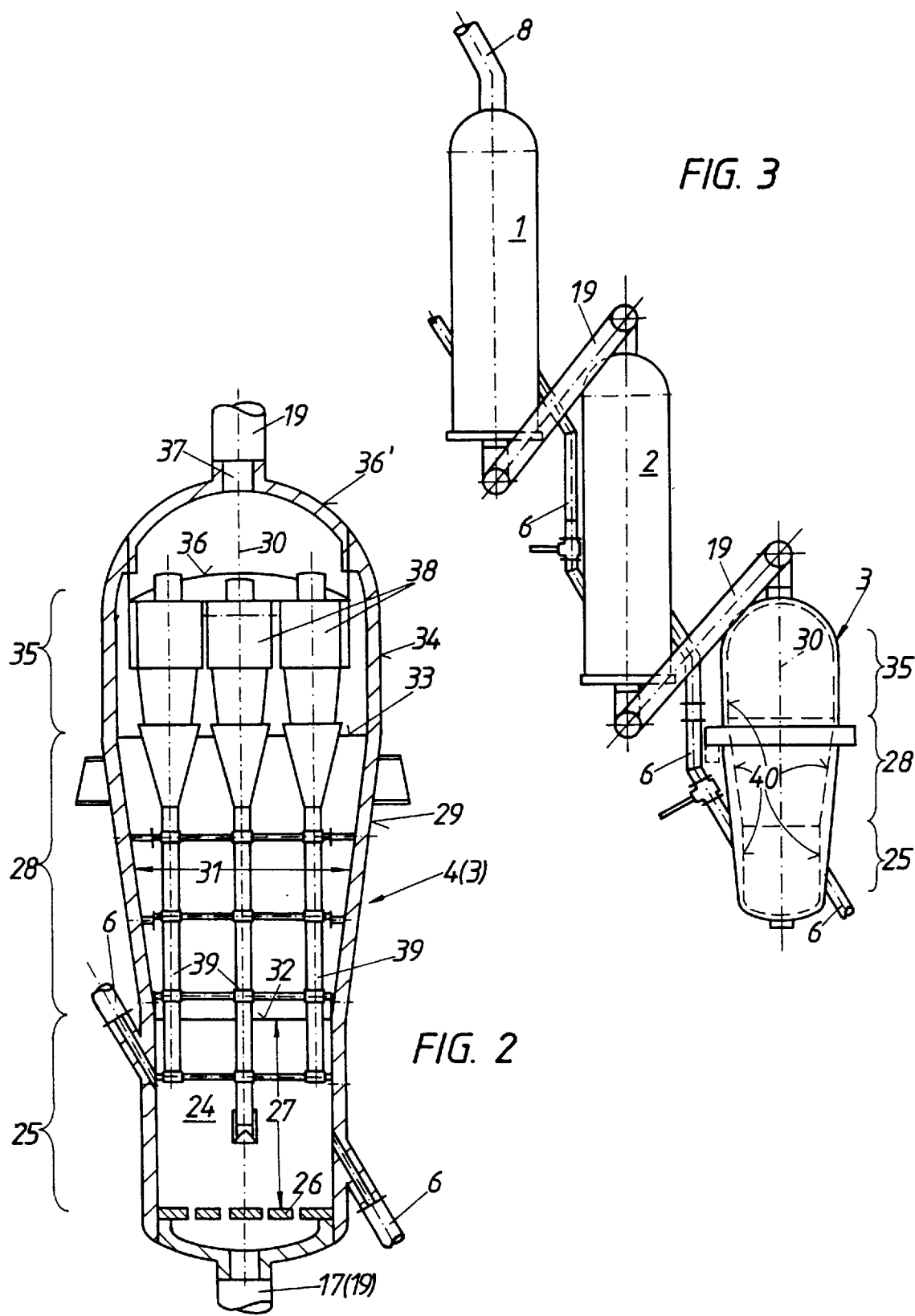

PROCESS FOR REDUCING OXIDE-CONTAINING MATERIAL AND PLANT FOR CARRYING OUT THE PROCESS

BACKGROUND OF THE INVENTION

1. Field of the Invention

The present invention relates to a process for reducing particulate oxide-containing material, in particular fine ore, in at least one whirl bed, wherein the oxide-containing material, by means of reducing gas flowing from bottom to top, is maintained in a whirl layer, thus being reduced. The invention also relates to a plant for carrying out the process.

2. Description of the Related Art

A process of this type is known, for instance, from U.S. Pat. No. 2,909,423, WO 92/02458 and EP 0 571 358. There, reduction of the oxide-containing material, for instance, fine ore, is effected in a whirl layer maintained by reducing gas within a whirl-layer reduction reactor, wherein the reducing gas, which is injected into the whirl-layer reduction reactor via a tuyere grid, flows through the reduction reactor from bottom to top, whereas the oxide-containing material passes the reduction reactor approximately in the transverse flow relative to the reducing gas flow. A certain speed of the reducing gas within the whirl layer zone is required for maintaining the whirl layer.

On account of the relatively high speed of the reducing gas, superfines of the oxide-containing material and reduced oxide-containing material, resulting from the reduction process, are being carried away from the whirl layer, whereupon the superfines will then be contained in the reducing gas. In order to eliminate such superfines from the reducing gas—so that, on the one hand, the partially oxidized reducing gas can be further used, for instance, for preceding reduction reactors and, on the other hand, the otherwise lost oxide-containing material or already reduced material will be recovered. The reducing gas containing said superfines is conducted through dust separators, such as cyclones, whereupon the dust separated out is recycled into the whirl layer. The dust separators or cyclones preferably are arranged within the reactors (cf. U.S. Pat. No. 2,909,423); but they also may be installed outside of the reactors.

In practice, it has been shown that partially reduced or completely reduced fine-grained particles of the oxide-containing material tend to adhere or cake to one another and/or to the walls of reactors or cyclones as well as to connection ducts and conveying ducts. These phenomena are called "sticking" or "fouling", respectively. Sticking or fouling is dependent on the temperature and on the degree of reduction of the oxide-containing material. Due to the partially or completely reduced oxide-containing material adhering to, or depositing on, the walls of the reduction reactors or other plant parts, failures may occur such that it is not possible to operate the plant continuously over an extended period of time without stoppage. It has been shown that the plant must be stopped every three to four months.

Removal of the deposits and cakings is very labor-intensive and involves high costs, i.e., labor and costs arising from the loss of production of the plant. Frequently, such deposits get separated automatically, thus either falling into the whirl layer and interfering with the reduction process or—in case of deposits separating from a cyclone—causing obstruction of the dust recycling channels that lead from the cyclone to the whirl layer and hindering further dust separation from the reducing gas.

The invention aims at avoiding these disadvantages and difficulties and has as its object provide a process of the type defined above, as well as a plant for carrying out the process, to through which the reducing of particulate oxide-containing material is feasible over a very long period of time without any risk of operational interruptions caused by sticking or fouling.

SUMMARY OF THE INVENTION

In accordance with the invention, this object is achieved in that the clear tube speed (superficial velocity) of the reducing gas, exclusively above the whirl layer, is continuously lowered over the total free cross section of a space above the whirl layer whereby generation of further whirl formations is avoided.

By this measure, sticking and fouling are effectively avoided despite a high gas speed of the reducing gas within the whirl layer, by substantively reducing the discharge of oxide-containing material or of partially or completely reduced material, entrained in the reducing gas. It has been proven that sticking and fouling are extremely reduced as soon as the amount of particles entrained in the reducing gas falls below a given maximum value which avoids the associated interruptions of operation caused thereby.

It is very important that the flow of the reducing gas above the whirl layer substantially proceeds in a manner in which no whirl formations occur, because any such whirls formed would decisively impede the reduction of discharging of superfines. Hence, the principle of the present invention is that the flow speed or superficial velocity of the reducing gas, i.e., its clear tube speed, is lowered over the total free cross section of the space above the whirl layer such that no whirl formations must occur there.

By the reduction of the clear tube speed of the reducing gas, extended uninterrupted periods of operation not only of the reduction reactors, but also of the cyclones and of all other plant parts that exhibit a tendency toward sticking and fouling (conveying tubes, etc.) may be expected. A further advantage of the invention is that the portion of fine grain contained in the particulate oxide-containing material may be increased without any risk of process disturbances, thus providing for an increased flexibility of the reduction process.

Since it has been shown that sticking and fouling occur to an increased extent as the oxide-containing material exhibits a greater degree of reduction, it is provided according to a preferred embodiment of the invention in a step-wise reduction of oxide-containing material in consecutively arranged whirl layers in which an increase in the degree of reduction occurs from step to step, to lower the clear tube speed of the reducing gas starting from the step in which a minimum degree of reduction of 25% has been obtained.

Preferably, the clear tube speed of the reducing gas is lowered starting from the step in which a minimum degree of reduction of 50% is obtained.

A substantial increase in the uninterrupted period of operation of a plant is feasible if the clear tube speed of the reducing gas above the whirl layer is lowered by at least 25%, preferably by at least 50%, the clear tube speed of the reducing gas advantageously being lowered from a range of from 0.8 m/s to 1.5 m/s on the entry side to a range of from 0.4 m/s to 0.75 m/s on the exit side.

Preferably, the clear tube speed in the whirl layer and in a space above the whirl layer in which the clear tube speed of the reducing gas is lowered is kept substantially constant.

A plant for carrying out the process, comprising at least one whirl-layer reduction reactor, is characterized in that the whirl-layer reduction reactor comprises a cylindrical lower whirl layer section accommodating the whirl layer and including a gas distribution bottom, a supply duct for the reducing gas and a supply duct and a discharge duct for oxide-containing material provided above the gas distribution bottom, a tapered section arranged above the whirl-layer section and following upon the same while widening conically upwards, the inclination of the wall of the tapered section relative to the central axis of the reactor amounting to 10° at most, and an at least partially cylindrical calming section following upon the tapered section, which calming section is closed on top and from which a reducing-gas discharge duct departs.

Suitably, the clear tube cross section in the tapered section increases by at least 25%, preferably by at least 50%, between the entry cross section and the exit cross section of the tapered section.

Preferably, at least one dust separator is arranged within the reduction reactor, its entry opening for the dust-loaded reducing gas being provided in the region of the calming section and a dust recycling duct of the dust separator extending downward into the whirl layer section.

Intermittance of the flow, and hence whirl formation, of the reducing gas within the tapered section is safely avoided if the inclination of the wall of the tapered section relative to the central axis of the reactor is 8° at most, the inclination of the wall of the tapered section relative to the central axis of the reactor suitably ranging between 6° and 8°.

In a plant which comprises a plurality of consecutively arranged whirl-layer reduction reactors connected by means of reducing gas ducts and by means of ducts conveying the oxide-containing material from one reactor to another reactor, only the ultimately arranged reactors, seen in the flow direction of the oxide-containing material, and preferably only the last arranged reactor, is/are provided with a tapered section.

BRIEF DESCRIPTION OF THE DRAWINGS

In the following, the invention will be explained in more detail by way of the drawings, described below.

FIG. 2 represents a cross section through a whirl-layer reduction reactor according to the embodiment of FIG. 1 along the line II—II.

FIG. 3 schematically shows a stepwise arrangement of three reduction reactors according to another embodiment of the present invention.

DETAILED DESCRIPTION OF THE PREFERRED EMBODIMENT

Figure 1:
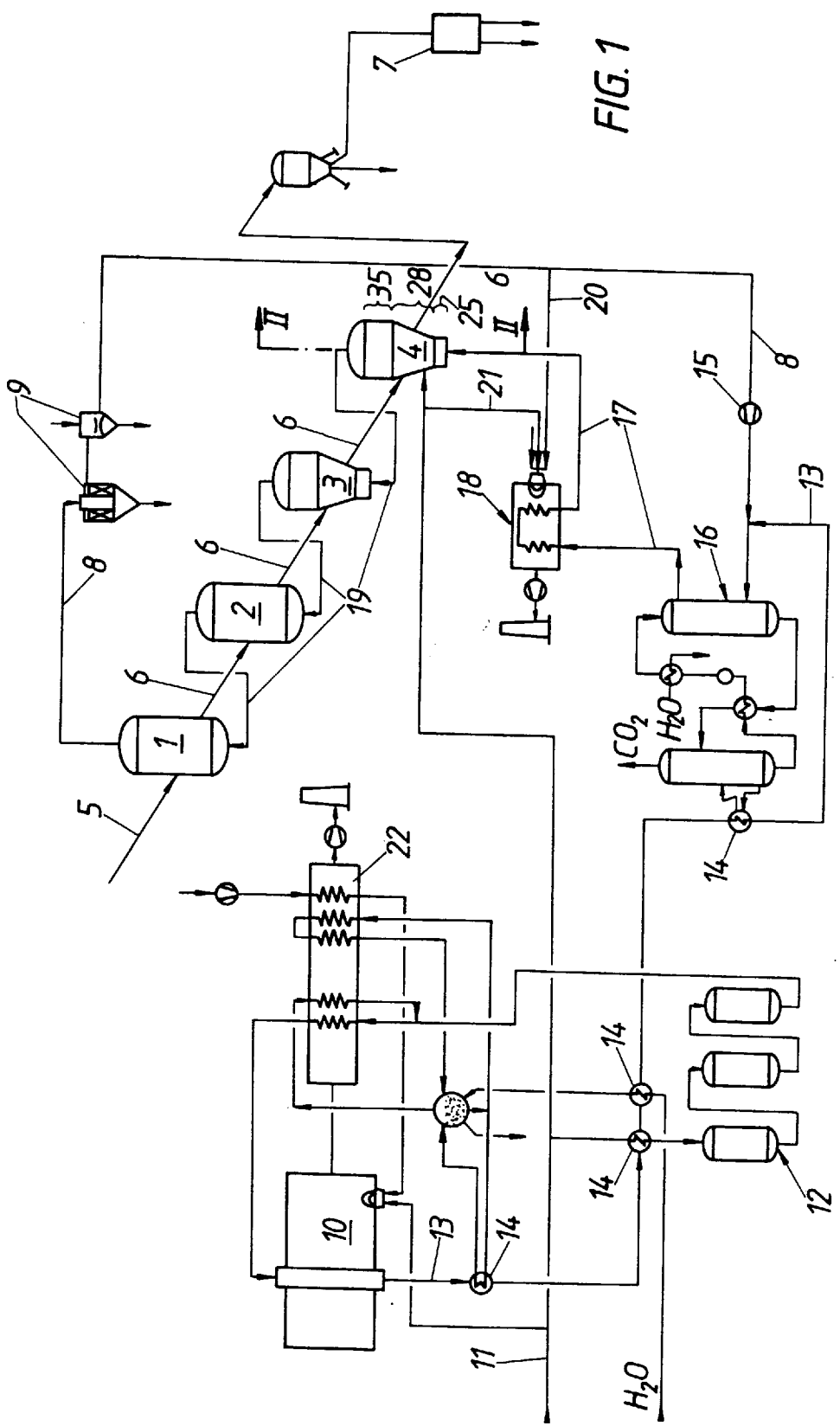
FIG. 1 illustrates a process diagram according to a first embodiment of the present invention.

The plant according to the invention comprises four whirl layer reduction reactors 1 to 4 consecutively arranged in series, wherein iron-oxide-containing material, such as fine ore, is supplied to the first whirl layer reduction reactor 1 through an ore supply duct 5 and is conducted from one whirl layer reduction reactor to another whirl layer reduction reactor via conveying ducts 6 and the completely reduced material (sponge iron) is hot-briquetted in a briquetting arrangement 7. If required, the reduced iron is protected from reoxidation during briquetting by an inert gas system not illustrated.

Prior to introducing the fine ore into the first reduction reactor 1, it is subjected to ore preparation, such as drying and sieving, not illustrated in detail.

Reducing gas is conducted in counterflow to the ore flow from one reduction reactor 4 to another reduction reactor 3 to 1 and is carried off the last reduction reactor 1, viewed in the gas flow direction, as a top gas through a top-gas discharge duct 8 and is cooled and scrubbed in a wet scrubber 9.

The production of reducing gas is effected by reforming in a reformer 10 natural gas fed through a duct 11 and desulfurized in a desulfurization plant 12. The reformed gas formed of natural gas and vapor essentially consists of $H_2$, CO, $CH_4$, $H_2O$ and $CO_2$. This reformed natural gas is supplied through a reformed-gas duct 13 to several heat exchangers 14, in which it is cooled, water thus being condensed out of the gas.

The reformed-gas duct 13 runs into the top-gas discharge duct 8 after the top gas has been compressed by means of a compressor 15. The mixed gas thus formed is passed through a $CO_2$ scrubber 16 and is cleared of $CO_2$, then being available as a reducing gas. This reducing gas, via a reducing-gas supply duct 17, is heated to a reducing gas temperature of about 800° C. in a gas heater 18 arranged to follow the $CO_2$ scrubber 16 and is fed to the first whirl layer reactor 4, viewed in the gas flow direction, where it reacts with the fine ores to produce directly reduced iron. The reduction reactors 4 to 1 are connected in series; the reducing gas travels from one reduction reactor to another reduction reactor through connection ducts 19.

A portion of the top gas is sleuced out of the gas circulatory system 8, 17, 19 in order to avoid enrichment of inert gases, such as $N_2$. The sleuced-out top gas is fed through a branch duct 20 to the gas heater 18 for heating the reducing gas and is burnt there. Possible shortages of energy are supplemented by natural gas supplied through a feed duct 21.

The sensible heat of the reformed gas emerging from the reformer 10 as well as of the reformer smoke gases is utilized in a recuperator 22 to preheat the feed gas (=natural gas-water vapor mixture) upon passage and to produce the vapor required for reformation. The combustion air supplied to the reformer 10 is preheated as well.

According to the embodiment of the reduction plant illustrated in FIG. 1, the two ultimately arranged reduction reactors 3 and 4, viewed in the conveying direction of the fine ore, are constructed in the following manner (cf. FIG. 2):

Each of the reduction reactors 3, 4 comprises a cylindrical lower whirl layer section 25 accommodating a whirl layer 24 provided on a predetermined level with a gas distribution bottom designed as a tuyere grid 26 for supplying and uniformly distributing the reducing gas. The reducing gas flows through the reduction reactor 3 and 4, respectively, from bottom to top departing from the tuyere grid 26. Above the tuyere grid 26, the conveying ducts 6 (supply and discharge ducts) for the fine ore enter the cylindrical whirl layer section 25. The whirl layer 24 has a layer height 27 from the tyuere grid 26 to a level above the level of the supply and discharge ducts 6 for the fine ore.

A tapered section 28, which conically widens upwards, follows upon the cylindrical whirl layer section 25, the inclination of the wall 29 of this tapered section 28 relative to the central axis 30 of the reactor amounting to 10° at most, preferably 6° to 8°. In that region, the gradual and continuous lowering of the clear tube speed (superficial velocity) of the upwardly flowing reducing gas is effected by continuous enlargement of the cross section 31. The enlargement of the cross sectional space is to be realized in a manner which decreases the clear tube speed within the tapered section 28 from the entry cross section 32 to the exit cross section 33 by at least 25%, preferably at least 50%.

Due to the only slight inclination of the wall 29 of the tapered section 28, it is feasible to obtain a flow without whirl formation and separation from the wall 29 despite the widening cross section 31 in that tapered section 28. Thereby, the formation of whirls, which would provoke a local increase in the speed of the reducing gas, are avoided. Hence, the uniform and continuous lowering of the clear tube speed of the reducing gas is ensured over the total cross section 31 of the tapered section 28 throughout the entire height thereof.

On the upper end of the tapered section 28, a calming section 35 follows, which is provided with a cylindrical wall 34 and is upwardly closed with a part-spherically designed ceiling 36. In the reactor ceiling 36' located above the ceiling 36, an opening 37 for carrying off reducing gas is centrally provided, said reducing gas being fed to the preceding reduction reactor 3 and 2, respectively, through connecting duct 19 following upon the opening 37.

Cyclones 38 are provided in the interior of the reduction reactor, arranged in the cylindrical part of the calming section 35 and serving to separate the dust from the reducing gas. Dust recycling ducts 39 departing from the cyclones 38 are directed vertically downwards, running into the whirl layer 24. The gas discharge ducts of the cyclones 38 extend into the space provided between the ceiling 36 and the reactor ceiling 36'.

The degrees of reduction of the fine ore at reaction reactor 1 are approximately 8%, at reduction reactor 2 are approximately 31%, at reduction reactor 3 are approximately 72% and at reduction reactor 4 are approximately 95%.

By lowering the reducing gas speed in the two reduction reactors 3 and 4 from 1.2 m/s in the whirl layer section 25 to 0.6 m/s on the upper end of the tapered section 28, the dust load of the cyclones 38 can be reduced from about 3000 $g/m^3$ to about 650 $g/m^3$. As a result, an average extension by more than six months of the period in which the plant may remain in operation without interruption is attainable.

According to the embodiment represented in FIG. 3, of a part of the reduction plant, three reduction reactors 1 to 3 are again arranged to be consecutively connected, yet only the reduction reactor 3 arranged last in the flow direction of the fine ore is provided with a tapered section 28. Although the last arranged reduction reactor has a metallic external wall designed to be conical as far as to the bottom of the reactor, a whirl layer section 25 is provided also therein, which is delimited by a cylindrical wall as is apparent from the broken lines indicating the internal wall 40 of the reduction reactor 4. The degree of reduction of the fine ore introduced into the last reduction reactor is more than 72%. Also in that case, an average extension by six months of the uninterrupted operation period of the plant could be reached.

We claim:

1. A process for reducing particulate oxide-containing material in at least one whirl bed reactor having a whirl layer section and a tapered section above the whirl layer section, said process comprising the steps of:
    reducing the oxide-containing material in the whirl layer section by means of a reducing gas flowing from the bottom to the top of the whirl layer section;
    maintaining the clear tube speed of the reducing gas at a substantially constant rate in the whirl layer section; and
    gradually and continuously lowering the clear tube speed of the reducing gas exclusively above the whirl layer from a bottom cross section to a top cross section of the tapered section while avoiding the generation of any whirl formations therein.

2. A process according to claim 1,
    wherein the reducing of the oxide-containing material is carried out in a stepwise manner in consecutively arranged whirl bed reactors such that the degree of reduction is increased from step to step, and
    wherein the clear tube speed of the reducing gas is lowered in each whirl bed reactor in which at least 25% of the oxide-containing material therein has been reduced.

3. A process according to claim 2, wherein the clear tube speed of the reducing gas is lowered in each whirl bed reactor in which at least 50% of the oxide-containing material therein has been reduced.

4. A process according to claim 1, wherein the clear tube speed of the reducing gas above the whirl layer is lowered by at least 25% from said bottom cross section to said top cross section of the tapered section.

5. A process according to claim 4, wherein the clear tube speed of the reducing gas above the whirl layer is lowered by at least 50% from said bottom cross section to said top cross section of the tapered section.

6. A process according to claim 1, wherein the clear tube speed of the reducing gas is lowered from a range of from 0.8 m/s to 1.5 m/s at said bottom cross section to a range of from 0.4 m/s to 0.75 m/s at said top cross section.

7. A process according to claim 1, further comprising the step of maintaining the clear tube speed of the reducing gas at a substantially constant rate in a section above the tapered section.

8. A process according to claim 1, wherein the process is carried out in a plant comprising at least one whirl bed reduction reactor, wherein the whirl bed reduction reactor comprises:
    a cylindrical lower whirl layer section for accommodating a whirl layer, said whirl layer section including
        a gas distribution bottom,
        a supply duct for the reducing gas, and
        a supply duct and a discharge duct for the oxide-containing material provided above the gas distribution bottom; and
    a tapered section arranged above the whirl layer section and including a wall which widens conically upwards from the whirl layer section.

9. A process according to claim 8, wherein the whirl bed reduction reactor further comprises an at least partially cylindrical calming section above the tapered section, wherein the calming section has a closed top and includes a reducing gas discharge duct.

10. A process according to claim 8, wherein the cross sectional area in the tapered section increases by at least 25% between an entry cross section and an exit cross section of the tapered section.

11. A process according to claim 10, wherein the cross sectional area in the tapered section increases by at least 50% between an entry cross section and an exit cross section of the tapered section.

12. A process according to claim 9, wherein the whirl bed reduction reactor further comprises at least one dust separator therewithin, each at least one dust separator having an entry opening in the calming section and a dust recycling duct connected thereto and extending into the whirl layer section.

13. A process according to claim 8, wherein the a wall of the tapered section widens conically upwards from the whirl layer section at a slope of at most 10° relative to a central axis of the reactor.

14. A process according to claim 13, wherein the wall of the tapered section widens at a slope of at most 80° relative to the central axis of the reactor.

15. A process according to claim 14, wherein the wall of the tapered section widens at a slope of between 6° and 8° relative to the central axis of the reactor.

16. A process according to claim 8, wherein the plant comprises a plurality of consecutively arranged whirl bed reduction reactors connected by reducing gas ducts and by conveying ducts which convey the oxide-containing material from one reactor to another reactor, whereupon only the last of the consecutively arranged reactors, viewed in the flow direction of the oxide-containing material, is provided with a tapered section.

17. A plant for reducing particulate oxide-containing material using the whirl bed method, the plant comprising:
  at least one whirl bed reduction reactor, wherein the whirl bed reduction reactor comprises:
    a cylindrical lower whirl layer reaction section for accommodating a whirl layer, said whirl layer section including
      a gas distribution bottom,
      a supply duct for supplying a reducing gas, and
      a supply duct and a discharge duct for the oxide-containing material provided above the gas distribution bottom; and
    a tapered section arranged above the whirl layer section and including a wall which widens conically upwards from the whirl layer section.

18. A plant according to claim 17, wherein the whirl bed reduction reactor further comprises an at least partially cylindrical calming section above the tapered section, wherein the calming section has a closed top and includes a reducing gas discharge duct.

19. A plant according to claim 17, wherein the cross sectional area in the tapered section increases by at least 25% between an entry cross section and an exit cross section of the tapered section.

20. A plant according to claim 19, wherein the cross sectional area in the tapered section increases by at least 50% between an entry cross section and an exit cross section of the tapered section.

21. A plant according to claim 18, wherein the whirl bed reduction reactor further comprises at least one dust separator therewithin, each at least one dust separator having an entry opening in the calming section and a dust recycling duct connected thereto and extending into the whirl layer section.

22. A plant according to claim 17, wherein the wall of the tapered section widens conically upwards from the whirl layer section at a slope of at most 10° relative to a central axis of the reactor.

23. A plant according to claim 22, wherein the wall of the tapered section widens at a slope of at most 8° relative to the central axis of the reactor.

24. A plant according to claim 23, wherein the wall of the tapered section widens at a slope of between 6° and 8° relative to the central axis of the reactor.

25. A plant according to claim 17, wherein the plant comprises a plurality of consecutively arranged whirl bed reduction reactors connected by reducing gas ducts and by conveying ducts which convey the oxide-containing material from one reactor to another reactor, whereupon only the last of the consecutively arranged reactors, viewed in the flow direction of the oxide-containing material, is provided with a tapered section.

* * * * *

UNITED STATES PATENT AND TRADEMARK OFFICE
CERTIFICATE OF CORRECTION

PATENT NO. : 5,873,926
DATED : February 23, 1999
INVENTOR(S) : Kepplinger et al.

It is certified that error appears in the above-identified patent and that said Letters Patent is hereby corrected as shown below:

In claim 14:

please replace "80°" with --8°--.

Signed and Sealed this

Twentieth Day of July, 1999

Attest:

Q. TODD DICKINSON

*Attesting Officer*     *Acting Commissioner of Patents and Trademarks*